United States Patent [19]

Schwuchow et al.

[11] 4,030,744
[45] June 21, 1977

[54] MOTOR VEHICLE BUMPER

[75] Inventors: Norbert Schwuchow, Sindelfingen; Hubert Hutai, Grafenau, both of Germany

[73] Assignee: Daimler-Benz Aktiengesellschaft, Germany

[22] Filed: Nov. 3, 1975

[21] Appl. No.: 628,244

[30] Foreign Application Priority Data
Nov. 6, 1974 Germany .......................... 2452593

[52] U.S. Cl. ............................... 293/71 R; 293/98; 293/99

[51] Int. Cl.² .......................................... B60R 19/00

[58] Field of Search ............. 293/71 R, 70, 72, 87, 293/98, 99

[56] References Cited

UNITED STATES PATENTS

| 3,843,182 | 10/1974 | Walls et al. | 293/72 |
| 3,897,967 | 8/1975 | Barenyi | 293/71 R |

Primary Examiner—Allen N. Knowles
Attorney, Agent, or Firm—Craig & Antonelli

[57] ABSTRACT

A U-shaped motor vehicle bumper of elastic material whose edge areas are brought into abutment against inclined outwardly directed walls of a mounting support by means of a plate which has a spacing from the mounting support on all sides.

9 Claims, 3 Drawing Figures

MOTOR VEHICLE BUMPER

The present invention relates to a U-shaped profiled motor vehicle bumper consisting of an elastic material, whose edge areas are brought into abutment by means of a plate at obliquely outwardly directed walls of a mounting support.

Such an arrangement is described in the German Offenlegungsschrift 2,204,087, whereby the plate is supported at the mounting support. By reason of tolerances conditioned on manufacture, it may thereby happen, for example, that an abutment of the plate at the mounting support takes place already at a point of time, at which no clamping of the edge area has occurred. By reason of the then inadequate seal, contaminations and moisture can penetrate and corrosion appearances may be caused.

It is therefore the task of the present invention to so secure a bumper of the aforementioned type that the edge areas abut with prestress even in case of occurrence of larger dimensional deviations.

Consequently, a U.-shaped profiled motor vehicle bumper consisting of an elastic material is proposed, whose edge areas can be brought into abutment by means of a plate at obliquely outwardly directed walls of a mounting support, whereby according to the present invention the plate has a spacing on all sides from the mounting support.

In one preferred embodiment of the present invention, spacer bushings or sleeves are secured at the plate which are provided at their free end with a threaded insert, by means of which a fastening at a vehicle cross bearer takes place.

A particularly high abutment force and therewih a good closure effect during the fastening operation can be achieved if the plate projects approximately roof-shaped from the spacer bushings between the edge areas of the bumper.

The bumper adapts itself well into the overall picture of the motor vechicle if the mounting support forms a part of the vehicle outer cover panels is supported at a vehicle cross bearer. Forces acting on the mounting support can thereby be effectively supported.

However, it may also be appropriate if the mounting support forms a part of a vehicle cross bearer.

Accordingly, it is an object of the present invention to provide a motor vehicle bumper which avoids by simple means the aforementioned shortcomings and drawbacks encountered in the prior art.

Another object of the present invention resides in a motor vehicle bumper in which a good sealing effect is assured even with large tolerances to thereby avoid the danger of corrosion of the parts.

A further object of the present invention resides in a motor vehicle bumper, in which the edge areas thereof abut with sufficient prestress even in case of larger dimensional deviations conditioned on manufacturing reasons.

A still further object of the present invention resides in a motor vehicle bumper in which a good closing and sealing action can be assured during the fastening operation even though relatively large tolerances are permitted in the various parts.

Still another object of the present invention resides in a motor vehicle bumper in which the forces acting on the mounting support of the bumper can be effectively absorbed.

These and further objects, features and advantages of the present invention will become more apparent from the following description when taken in connection with the accompanying drawing which shows, for purposes of illustration only, several embodiments in accordance with the present invention, and wherein.

Figure 1:
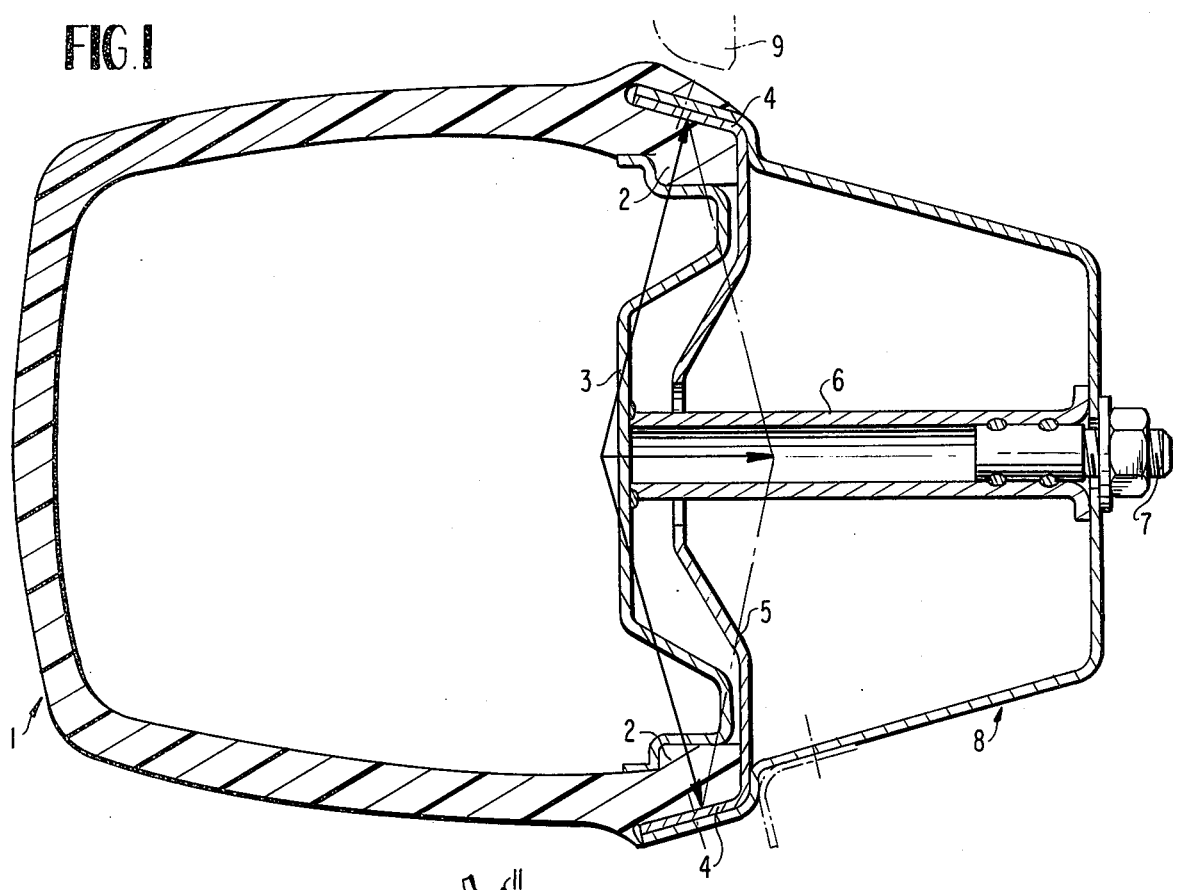
FIG. 1 is a cross-sectional view through a forward bumper fastening arrangement in accordance with the present invention.

Referring now to the drawing wherein like reference numerals are used throughout the various views to designate like parts, and more particularly to FIG. 1, a bumper generally designated by reference numeral 1, which consists of a conventional elastic material, is provided with edge areas 2 which are pressed by a plate 3 against the obliquely outwardly directed walls 4 of a mounting support 5. Since the plate 3 has a spacing on all sides with respect to the mounting support 5, the edge areas 2 are always so strongly pressed against the mounting support 5—as is shown by the force parallelogram in FIG. 1—a reliable seal and a good closing effect take place. Several spacer bushings or sleeves 6 projecting from the plate 3 at a distance from one another, which are provided at their free end with a threaded insert 7, serve for the fastening at a vehicle cross bearer generally designated by reference numeral 8. The apertured mounting support 5 may thereby form—as shown in FIG 1—a part of the vehicle cross bearer 8. For styling reasons, it may be appropriate to so construct at least the upper edge area 2 of the bumper 1 that the forward part of the vehicle cross bearer 8—which may be adjoined, for example, in the upward direction, by a radiator body covering 9—is covered off.

Figure 2:
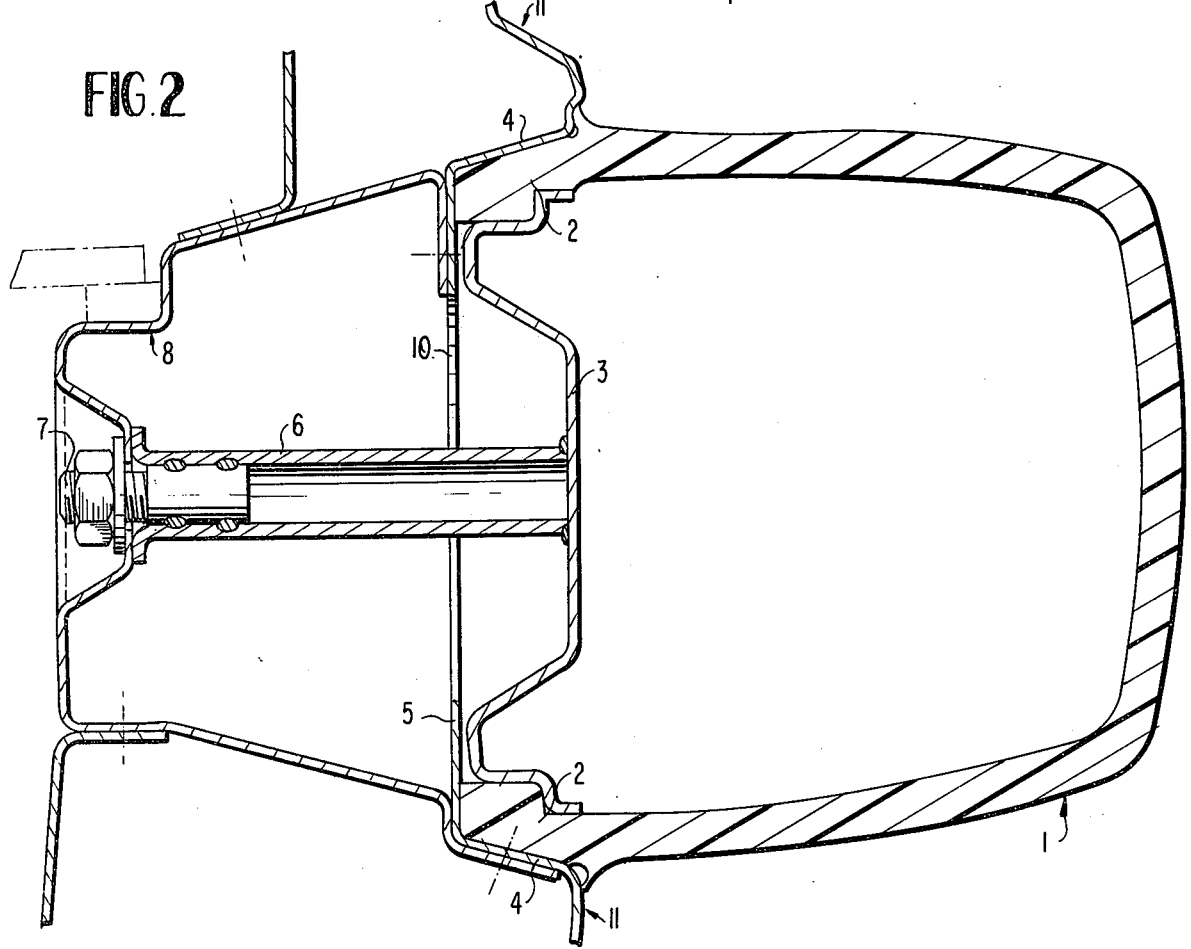
FIG. 2 is a cross-sectional view through a modified embodiment of a bumper fastening arrangement according to the present invention at a motor vehicle rear section.
Figure 3:
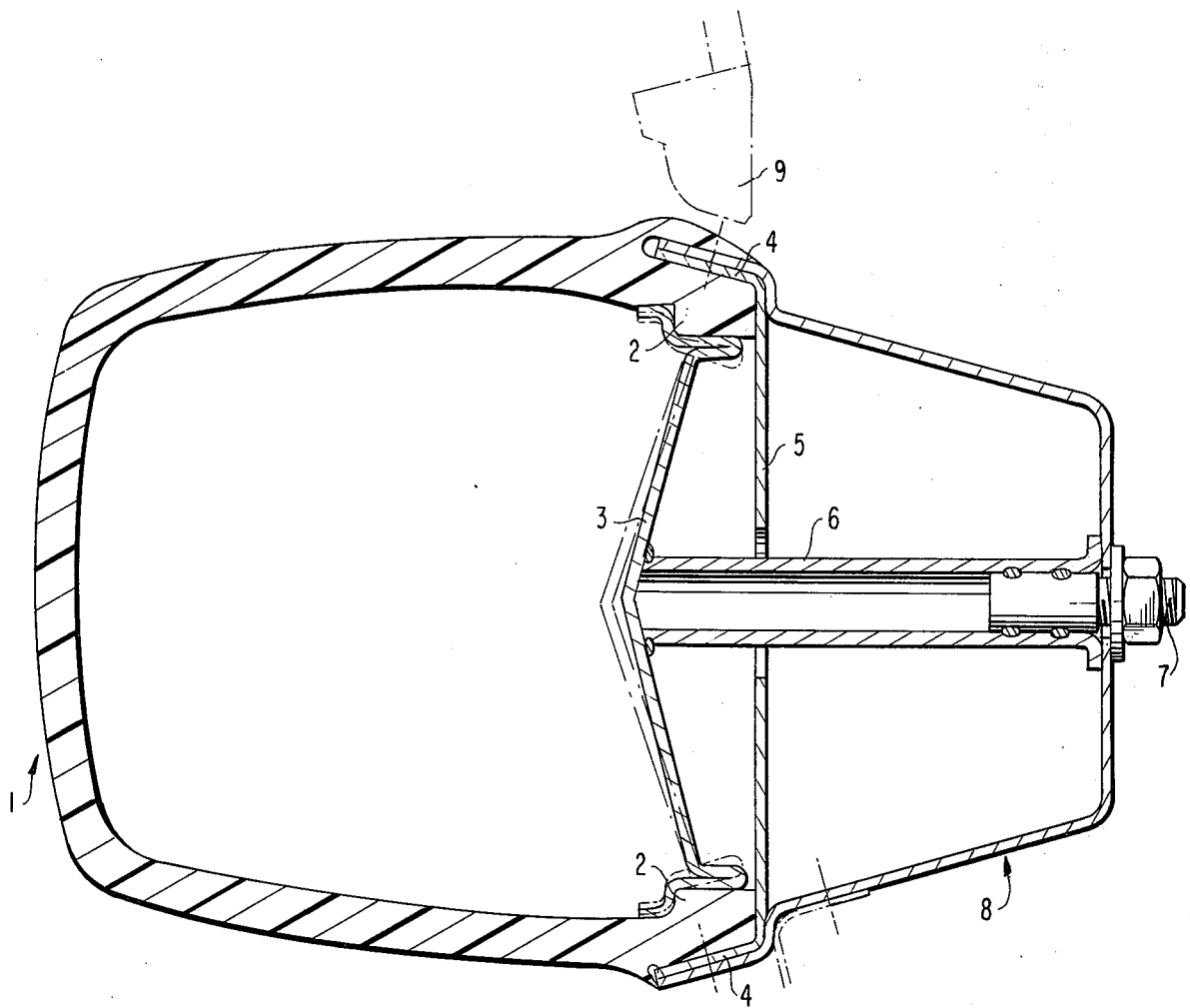
FIG. 3 is a cross-sectional view of a still further modified embodiment of a bumper fastening arrangement according to the present invention with an approximately roof-shaped plate.

In the embodiment according to FIG. 2, the mounting support 5 provided, for example, with apertures 10, represents a part of the vehicle outer cover panel generally designated by reference numeral 11 whereby a pleasing appearance can be achieved, whereas in FIG. 3, the plate 3 receives an intentional eleastic deformation during the tightening of the threaded connection by reason of its approximately roof-shaped configuration as shown in dash and dot lines and full lines. A good abutment effect on the edge areas 3 is achieved thereby.

Since the fastening places of the bumper 1 are located at readily accessible places, and exchange can take place within a short period of time.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A motor vehicle bumper of elastic material, which includes edge areas adapted to be brought into abutment by a plate means against inclined outwardly directed walls of a mounting support means, wherein the plate means has a spacing from the mounting support means substantially on all sides and the bumper has an approximately U-shaped profile, and wherein spacer sleeve means are secured at the plate means, which are provided at the free end with a threaded insert means, said threaded insert means enabling a fastening of the plate means at a vehicle cross bearer, wherein the plate means project approximately roof-shaped from the spacer sleeve means between the edge areas of the bumper.

2. A bumper according to claim 1, characterized in that the mounting support means forms a part of the vehicle outer body panel means and is supported at the vehicle cross bearer.

3. A bumper according to claim 1, characterized in that the mounting support means forms a part of the vehicle cross bearer.

4. A motor vehicle bumper of elastic material, which includes edge areas adapted to be brought into abutment by a plate means against inclined outwardly directed walls of a mounting support means, characterized in that the plate means has a spacing from the mounting support means substantially on all sides and wherein the plate means projects approximately roof-shaped from a spacer sleeve means secured at the plate means edge areas of the bumper.

5. A bumper according to claim 4, characterized in that the bumper has an approximately U-shaped profile.

6. A bumper according to claim 5, characterized in that spacer sleeve means are secured at the plate means, which are provided at the free end with a threaded insert means, said threaded insert means enabling a fastening of the plate means at a vehicle cross bearer.

7. A bumper according to claim 4, characterized in that the mounting support means forms a part of the vehicle outer body panel means and is supported at a vehicle bearer.

8. A bumper according to claim 4, characterized in that the mounting support means forms a part of a vehicle cross bearer.

9. A bumper according to claim 4, characterized in that spacer sleeve means are secured at the plate means, which are provided at the free end with a threaded insert means, said threaded insert means enabling a fastening of the plate means at a vehicle bearer.

* * * * *